(12) United States Patent
Iijima (10) Patent No.: US 9,175,992 B2
(45) Date of Patent: Nov. 3, 2015

(54) ELECTROMAGNETIC FLOW METER HAVING LINER REINFORCING PLATE AND A CYLINDRICAL PLATE HAVING CUTOUT PORTIONS AT THE ENDS

(71) Applicant: Kabushiki Kaisha Toshiba, Minato-ku (JP)

(72) Inventor: Takuya Iijima, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 199 days.

(21) Appl. No.: 14/011,142

(22) Filed: Aug. 27, 2013

(65) Prior Publication Data

US 2014/0000382 A1   Jan. 2, 2014

Related U.S. Application Data

(62) Division of application No. 13/565,329, filed on Aug. 2, 2012, now Pat. No. 8,707,800, which is a division of application No. 12/782,351, filed on May 18, 2010, now Pat. No. 8,397,585.

(30) Foreign Application Priority Data

May 19, 2009   (JP) .................................. 2009-121219

(51) Int. Cl.
   *G01F 1/58*   (2006.01)
(52) U.S. Cl.
   CPC . *G01F 1/582* (2013.01); *G01F 1/58* (2013.01)
(58) Field of Classification Search
   None
   See application file for complete search history.

(56) References Cited

U.S. PATENT DOCUMENTS

2009/0178489 A1*   7/2009   Iijima .................. 73/861.11
2010/0294044 A1*   11/2010   Iijima .................. 73/861.11

FOREIGN PATENT DOCUMENTS

| DE | 32 12 150 A1 | 11/1982 |
| DE | 696 34 969 T2 | 6/2006 |
| DE | 10 2006 018 415 A1 | 10/2007 |
| GB | 2 402 219 A | 12/2004 |
| JP | 58-26621 | 2/1983 |
| JP | 59-16622 A | 1/1984 |
| JP | 59-198318 | 11/1984 |

(Continued)

OTHER PUBLICATIONS

Office Action issued Jul. 16, 2013 in Japanese Patent Application No. 2009-121219 (with English-language translation).
Office Action issued Nov. 8, 2013 in Japanese Patent Application No. 2009-121219 (with English language translation).

(Continued)

*Primary Examiner* — Harshad R Patel
(74) *Attorney, Agent, or Firm* — Oblon, McClelland, Maier & Neustadt, L.L.P.

(57) ABSTRACT

An electromagnetic flow meter provided with a resin lining portion has a lining locking frame composed of a cylindrical plate with openings and a plurality of belt shaped ring plates. The cylindrical plate with openings is provided with not less than two cutout portions from an end which are provided alternately from the both ends in the pipe axis direction and so as to lap in the pipe axis direction. A first gap is provided between the inner face of the measuring pipe and the outer circumference face of the cylindrical plate with openings. The resin to be lined is filled between the measuring pipe and the lining locking frame via gaps formed by the cutout portions.

2 Claims, 8 Drawing Sheets (56) References Cited

FOREIGN PATENT DOCUMENTS

| | | |
|---|---|---|
| JP | 62-1118 | 1/1987 |
| JP | 4-236892 A | 8/1992 |
| JP | 5-18800 A | 1/1993 |
| JP | 6-174511 A | 6/1994 |
| JP | 2002-48612 | 2/2002 |
| WO | WO 2006/050744 A1 | 5/2006 |

OTHER PUBLICATIONS

Chinese Office Action issued Sep. 22, 2011, in Patent Application No. 201010183494.3 (with English-language translation).
Office Action issued Jan. 3, 2012, in Korean Patent Application No. 10-2010-0046292 (with Japanese translation).
German Office Action issued Nov. 14, 2012 in Patent Application No. 10 2010 020 768.3 with English Translation.

* cited by examiner

ELECTROMAGNETIC FLOW METER HAVING LINER REINFORCING PLATE AND A CYLINDRICAL PLATE HAVING CUTOUT PORTIONS AT THE ENDS

CROSS-REFERENCE TO RELATED APPLICATIONS

This application is a divisional of U.S. application Ser. No. 13/565,329 filed Aug. 2, 2012, which is a divisional of U.S. application Ser. No. 12/782,351 filed May 18, 2010, now U.S. Pat. No. 8,397,585, issued Mar. 19, 2013, which claims priority under 35 U.S.C. 119 to Japanese Patent Application No. 2009-121219 filed May 19, 2009; the entire contents of each of which are incorporated herein by reference.

BACKGROUND OF THE INVENTION

1. Field of the Invention

The present invention relates to an electromagnetic flow meter, and more particularly to an electromagnetic flow meter provided with a measuring pipe to flow fluid to be measured in which a resin lining portion is lined by pressure molding.

2. Description of the Background

An electromagnetic flow meter generates a magnetic field in a measuring pipe by flowing current in a coil, and detects a magnitude of an electromotive force generated according to the dielectric constant of the fluid flowing in the magnetic field so as to measure a flow rate. At the inner face of the measuring pipe of such an electromagnetic flow meter, the lining is performed for insulation, by resin such as fluorine contained resin and polyurethane resin and so on.

As a resin lining method of the electromagnetic flow meter, a method called transfer molding is known, for example. In this method, a die is fitted on both ends and an inner portion of the measuring pipe, and these are heated to an approximately melting point of the resin to be lined, and then the melted resin is pressurized and inpoured in gaps between the measuring pipe and the die.

In addition, as another resin lining method, a method called mold forming or injection molding is known. In this method, a die is fitted on both ends and an inner portion of the measuring pipe, and these are heated but not to an approximately melting point of the resin to be lined, and then the melted resin is pressurized and inpoured in gaps between the measuring pipe and the die.

Further, as another resin lining method, a method is known further in which a die is fitted on both ends and an inner portion of the measuring pipe, pellets of the resin to be lined are preliminarily inserted in gaps between the measuring pipe and the die, these are heated till the resin pellets to be lined melt in the gaps between the measuring pipe and the die, and then the resin is pressurized and molded.

In addition, hereinafter, these three molding methods are called generally as pressure molding methods.

In a conventional electromagnetic flow meter with a measuring pipe in which resin lining is performed, so as to prevent a resin lining portion from peeling off from the measuring pipe in such a case that the inside of the measuring pipe becomes at a negative pressure for the ambient air, a technique is known that the resin is inpoured for lining after a cylindrical plate with openings is pasted on the inner face of the measuring pipe as a reinforcing member.

A following forming method is disclosed (refer to Patent Document 1, for example). That is, a forming method is disclosed in which a tubular body with openings is formed by winding a plate with openings as a reinforcing member to be embedded in the resin in a cylindrical shape so as to be inserted in the measuring pipe, and then spacers are fitted at the outer circumference face of the tubular body with openings, and after the tubular body with openings is inserted and fitted in the measuring pipe, the measuring pipe is coated with resin by mold forming. In the forming method, before mold forming the tubular body with openings, while contacting both ends of the plate with openings tightly in the circumference direction, the plate with openings is displaced in the axis line direction so as to increase the diameter of the tubular body with openings till the outer circumference faces of the spacers contact tightly with the inner circumference face of the measuring pipe to form the tubular body with openings.

In addition, as a technique to prevent a resin lining portion from peeling off from a measuring pipe without using a reinforcing member, a technique is known that dovetail grooves are formed in circumference shapes at the inner face of the measuring pipe, or dovetail grooves are formed at the inner face of the measuring pipe in the axis direction, and the resin is inpoured for lining (refer to Patent Document 2, for example).

Patent Document 1: Japanese Patent Publication (Kokoku) PH3-124

Patent Document 2: Japanese Utility Model Publication (Kokoku) US61-16493

Figure 8A:
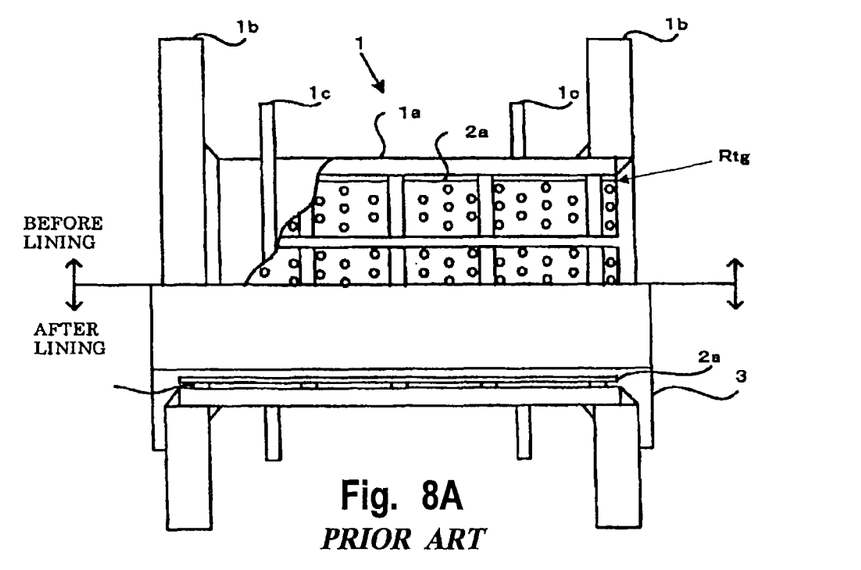
FIGS. 8A, 8B, 8C are diagrams, each showing a construction of a conventional electromagnetic flow meter which is provided with a lining locking frame composed of a cylindrical plate with openings and belt-like ring plates.
Figure 8B:
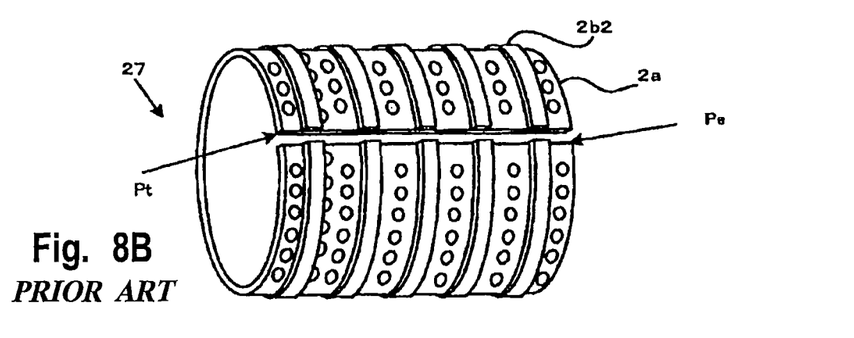

A forming method of a resin lining of a conventional electromagnetic flow meter will be described with reference to FIGS. 8A, 8B, 8C. FIG. 8A is a diagram to explain a lining structure, and FIG. 8B is a perspective view showing an appearance of a lining locking frame 27 to prevent the lining from peeling off.

A side sectional view of an upper portion from a center of a pipe axis of a measuring pipe 1 in FIG. 8A indicates a state before resin lining. The measuring pipe 1 to flow fluid to be measured is composed of a pipe body 1a, a pair of flanges 1b provided at the end portions of the pipe body 1a, and a pair of internal substance storing boards 1c to store the loading substance such as a coil and so on, which are welded on the outer circumference of the pipe body 1a symmetrically to the center of the pipe axis in the pipe axis direction of the pipe body 1a.

In addition, a side sectional view of a lower portion from the center of the pipe axis in FIG. 8A indicates a state after resin lining to the measuring pipe 1. A resin lining portion 3 to be lined at the inner wall of the measuring pipe is made of an insulating material such as fluorine contained resin and polyurethane resin and so on. In addition, the lining locking frame 27 formed in a cylinder shape of a thin steel plate with a plurality of openings bored is embedded by mold forming.

The lining locking frame 27 is composed of a cylindrical plate with openings 2a and a plurality of belt-like ring plate 2b2 welded around the outer circumference of the cylindrical plate with openings 2a.

The lining locking frame 27 is loaded in the measuring pipe 1 so as to contact the outer face with the inner face of the measuring pipe 1.

Then, a lining molding die not shown is fitted around the measuring pipe 1 loaded with the lining locking frame 27. And the resin lining material is pressure injected from an end of the measuring pipe 1 between the lining molding die and the inner face of the measuring pipe 1. By this, the resin lining material is filled around the lining locking frame 27 via a lot of openings A of the lining locking frame 27, so that the resin lining portion 3 is formed by embedding the lining locking frame 27.

The resin lining portion 3 formed as described above is provided with a structure in which the resin lining portion 3 is locked by the lining locking frame 27 and is enforced, and in addition, the lining portion 3 is made possible to outstand the change in negative pressure and external pressure and is not peeled off easily from the measuring pipe 1.

Next, a problem of forming the resin lining portion 3 of the conventional electromagnetic flow meter constructed as described above will described with reference to FIG. 8C.

Regarding the lining locking frame 27, the belt-like ring plates 2b2 are contacted with, and a few of the belt-like ring plates 2b2 are spot welded to the inner circumference face of the measuring pipe 1. In this case, there is a problem that the diameter of the cylindrical plates with openings 2a made of the thin steel plate and the inner diameter of the measuring pipe 1 are contacted within a prescribed tolerance and are welded so that the cylindrical plates with openings 2a does not float from the inner face of the measuring pipe 1. Regarding this problem, a solving method is disclosed in Patent Document 1, for example.

But in the forming method of the resin lining disclosed in Patent Document 1, there is a problem as described below.

Figure 8C:
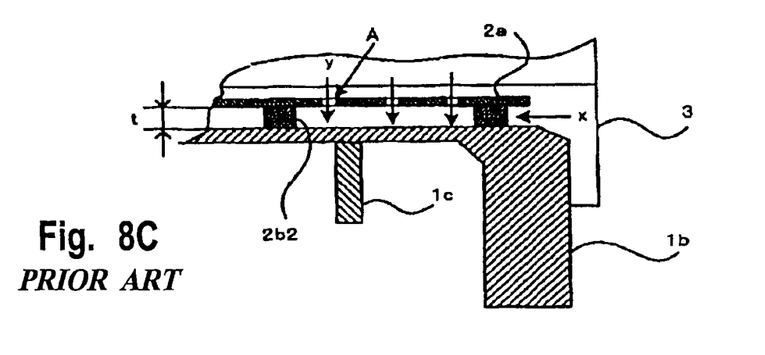

A radial thickness of the resin lining portion 3 is set by providing a prescribed gap x between the cylindrical plate with openings 2a and the measuring pipe 1 at the circumference of the lining locking frame 27 as shown in FIG. 8C. Regarding the gap x, the radial thickness t in the direction perpendicular to the pipe axis is set by a plate thickness t of the belt-like ring plates 2b2, for example.

The resin lining portion 3 is formed mainly by pressure injecting the melted lining resin in the space partitioned by the belt-like ring plates 2b2 from a lot of the openings A of the cylindrical plate with openings 2a. In this time, in order to keep the quality of a uniform strength at each portion of the resin lining portion 3, it is required to form the resin lining portion 3 without including the air bubbles and without remaining residual stress in the lining resin itself caused by the non-uniformity of the pressure at the pressing places.

For the reason, in case of the lining locking frame with a construction disclosed in Patent Document 1, there was a problem that a high level molding technique such as transfer molding or injection molding is required to heat the measuring pipe and the die for mold forming, and in addition, to inpour the lining resin by pressure melting at not less than the prescribed temperature.

In addition, in forming the resin lining according to the electromagnetic flow meter of above-described Patent Document 2, a technique is disclosed to perform lining by trenching a plurality of dovetail grooves extending in the direction of the entire length of the pipe axis along the circumference direction at the inner circumference face of the measuring pipe, so as to prevent the lining resin from peeling off from the measuring pipe.

However, so as to provide a plurality of such dovetail grooves, there is a problem that though it is possible to fabricate the dovetail grooves at the end portions of the measuring pipe, it is difficult to fabricate the dovetail grooves at the central portion of the measuring pipe. In addition, as the lining resin is to be inpoured at the acute portions of the dovetail grooves without including air bubbles, there is a problem after all that a high level molding technique such as transfer molding or injection molding is required.

SUMMARY OF THE INVENTION

Accordingly, an object of the present invention is to provide an electromagnetic flow meter which can form a resin lining portion easily without generating air bubbles and residual stress in the lining resin, and without using a high level molding technique such as transfer molding or injection molding.

According to an aspect of the present invention, there is provided an electromagnetic flow meter provided with a lining portion in which resin is lined in a measuring pipe by pressure molding, including the measuring pipe to flow liquid to be measured, a lining locking frame provided in the measuring pipe, composed of a cylindrical plate with openings and a plurality of divided belt-like ring plates, and the resin lining portion formed by embedding the lining locking frame. The cylindrical plate with openings is formed by facing both end faces of a belt-like plate with openings with a prescribed length in a circumference direction of the measuring pipe so that the belt-like plate with openings becomes a cylindrical shape concentric with the measuring pipe. Each of the divided belt-like ring plates is composed of a plurality of belt-like plates with a prescribed length and is made ring-like around the outer circumference of the cylindrical plate with openings by providing second gaps between the belt-like plates in the outer circumference direction, and a plurality of the divided belt-like ring plates are pasted with a prescribed interval in the pipe axis direction of the measuring pipe, and in addition, a thickness of the belt-like plate is a prescribed thickness, and a first gap is provided between the inner face of the measuring pipe and the outer circumference face of the cylindrical plate with openings. In case of pressure molding the resin lining portion, the resin to be lined can be filled easily in gaps between the measuring pipe and the lining locking frame via gaps formed by the first gap and the second gaps of the divided belt-like ring plates.

According to another aspect of the present invention, there is provided an electromagnetic flow meter provided with a resin lining portion in which resin is lined in a measuring pipe by pressure molding, including the measuring pipe to flow liquid to be measured, a lining locking frame provided in the measuring pipe composed of a cylindrical plate with openings and a belt-like spiral plate, and the resin lining portion formed by embedding the lining locking frame. The cylindrical plate with openings is formed by facing both end faces of a belt-like plate with openings with a prescribed length in a circumference direction of the measuring pipe so that the belt-like plate with openings becomes a cylindrical shape concentric with the measuring pipe. The belt-like spiral plate is composed of a belt-like plate pasted spirally around the outer circumference of the cylindrical plate with openings, a thickness of the belt-like plate is set to a prescribed thickness, a first gap is set between the inner face of the measuring pipe and the outer circumference face of the cylindrical plate with openings, and in addition, the belt-like plate is wound around the cylindrical plate with openings in the pipe axis direction of the measuring pipe with a prescribed interval so as to provide a spiral third gap. In case of pressure molding the resin lining portion, the resin to be lined can be filled easily in gaps between the measuring pipe and the lining locking frame via gaps formed by the first gap and the third gap.

According to another aspect of the present invention, there is provided an electromagnetic flow meter provided with a resin lining portion in which resin is lined in a measuring pipe by pressure molding, including the measuring pipe to flow liquid to be measured, a lining locking frame provided in the measuring pipe composed of a cylindrical plate with openings and a plurality of belt-like ring plates, and the resin lining portion formed by embedding the lining locking frame. The cylindrical plate with openings is formed by facing both end faces of a belt-like plate with openings with a prescribed length in a circumference direction of the measuring pipe so that the belt-like plate with openings becomes a cylindrical shape concentric with the measuring pipe. A plurality of the belt-like plates are pasted with a prescribed interval around the outer circumference of the cylindrical plate with openings in the pipe axis direction of the measuring pipe. The cylindrical plate with openings is provided with not less than two cutout portions from an end which are provided alternately from the both ends in the pipe axis direction and so as to lap in the pipe axis direction. In addition, a thickness of the belt-like ring plate is a prescribed thickness, and a first gap is provided between the inner face of the measuring pipe and the outer circumference face of the cylindrical plate with openings. In case of pressure molding the resin lining portion, the resin to be lined can be filled easily in gaps between the measuring pipe and the lining locking frame via gaps formed by the first gap and fourth gaps formed by the cutout portions.

According to another aspect of the present invention, there is provided an electromagnetic flow meter provided with a resin lining portion in which resin is lined in a measuring pipe by pressure molding, including the measuring pipe to flow liquid to be measured, a lining locking frame provided in the measuring pipe composed of divided cylindrical plates with openings and a plurality of belt-like ring plates, and the resin lining portion formed by embedding the lining locking frame. The divided cylindrical plates with openings are composed of not less than two belt-like plates with openings with a prescribed length which are provided to face both end faces of the belt-like plates with openings of the measuring pipe so as to form a cylindrical shape concentric with the measuring pipe with prescribed fifth gaps in a circumference direction of belt-like plates with openings. A plurality of the belt-like ring plates are pasted with a prescribed interval around the outer circumference of the divided cylindrical plates with openings in the pipe axis direction of the measuring pipe, and a thickness of the belt-like plate is a prescribed thickness and a first gap is provided between the inner face of the measuring pipe and the outer circumference face of the divided cylindrical plates with openings. In case of pressure molding the resin lining portion, the resin to be lined can be filled easily in gaps formed between the measuring pipe and the lining locking frame via the gaps formed by the first gap and the fifth gaps.

As described above, according to the present invention, as the gaps are provided in which the lining resin material to be pressure molded around the lining locking frame can easily be inpoured from any direction of the pipe axis direction and the direction perpendicular to the pipe axis, an electromagnetic flow meter can be provided which can form a resin lining portion easily without generating air bubbles and residual stress in the lining resin, and without using a high level molding technique such as transfer molding or injection molding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Referring now to the drawings, wherein like reference numerals designate identical or corresponding parts throughout the several views, the embodiments of this invention will be described below.

First Embodiment

Figure 1A:
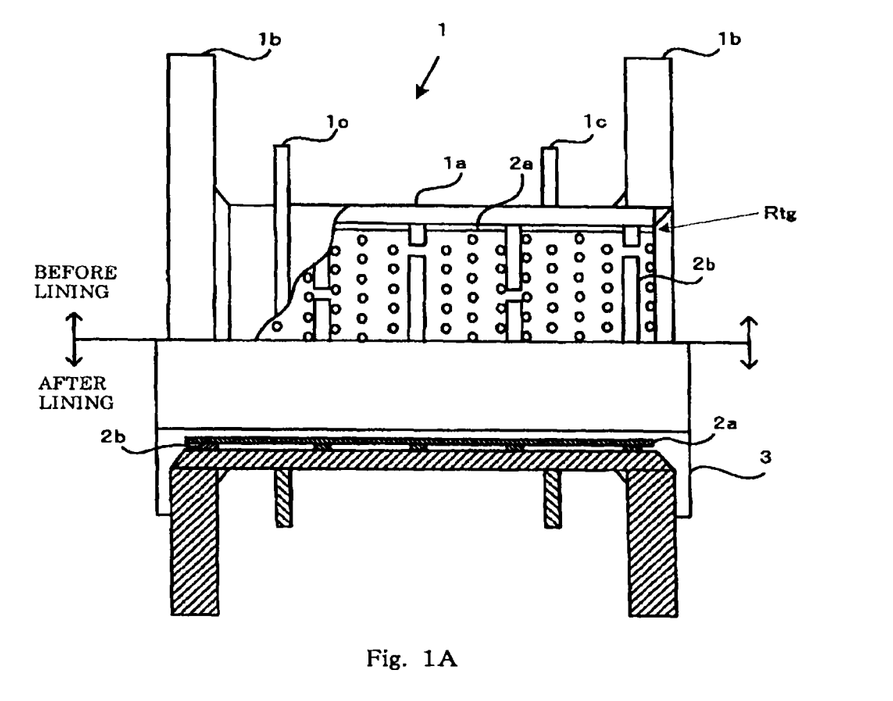
FIGS. 1A, 1B are diagrams, each showing a construction of an electromagnetic flow meter according to a first embodiment of the present invention which is provided with a lining locking frame composed of a cylindrical plate with openings and divided belt-like ring plates.
Figure 1B:
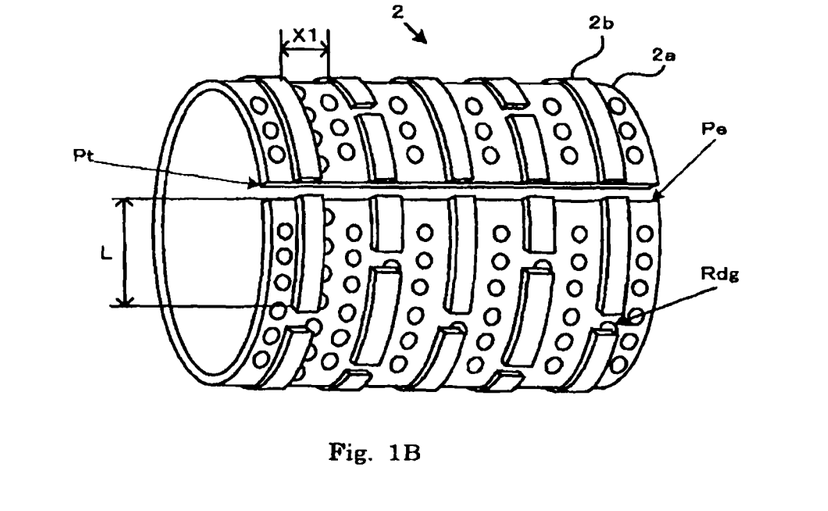

FIG. 1A is a diagram to explain a construction of an electromagnetic flow meter with a lining locking frame 2 of a first embodiment of the present invention, and FIG. 1B is a perspective view showing an appearance of the lining locking frame 2 of the first embodiment of the present invention.

In FIG. 1A, a side sectional view of an upper portion from a center of a pipe axis of the measuring pipe 1 indicates a state before resin lining. The measuring pipe 1 to flow fluid to be measured is composed of the pipe body 1a, a pair of the flanges 1b provided at both the end portions of the pipe body 1a, and a pair of the internal substance storing boards 1c to store loading substance such as a coil and so on, which are welded on the outer circumference of the pipe body 1a in the pipe axis direction of the pipe body 1a and symmetrically to the center of the pipe axis.

In addition, a side sectional view of a lower portion from the center of the pipe axis of the measuring pipe 1 of FIG. 1A indicates a state after resin lining to the measuring pipe 1. The resin lining portion 3 to be lined at the inner wall of the measuring pipe 1 is made of an insulating material such as fluorine contained resin and polyurethane resin and so on. In addition, a lining locking frame 2 formed in a cylinder shape of a thin steel plate with a plurality of openings bored is embedded by pressure forming.

A construction of the electromagnetic flow meter of the present first embodiment is composed of the measuring pipe 1 to flow fluid to be measured, the lining locking frame 2 provided in the measuring pipe 1, and the resin lining portion 3 which is pressure formed by embedding the lining locking frame 2. The lining locking frame 2 is composed of the cylindrical plate with openings 2a and a plurality of divided belt-like ring plates 2b. The cylindrical plate with openings 2a is formed by facing both end faces Pt, Pe of a belt-like plate with openings with a prescribed length in a circumference direction of the measuring pipe 1, so that the belt-like plate with openings becomes a cylindrical shape concentric with the measuring pipe 1. Each of a plurality of divided belt-like plates 2b are composed of a plurality of belt-like plates with a prescribed length L and is made ring-like around the outer circumference of the cylindrical plate with openings 2a by providing second gaps Rdg between the belt-like plates in the outer circumference direction. And a plurality of the divided belt-like plates 2b are pasted with a prescribed interval X1 in the pipe axis direction of the measuring pipe 1. In addition, a thickness of the belt-like plate is set a prescribed thickness, and a first gap Rtg is provided between the inner face of the measuring pipe 1 and the outer circumference face of the cylindrical plate with openings 2a.

The ring interval X1 between the divided belt-like ring plates 2b can be set arbitrarily to an optimum value based on a pipe diameter of the measuring pipe 1 to be resin lined and a plate width of the divided belt-like ring plate 2b, by considering the easiness to fit the lining locking frame 2 to the inside of the measuring pipe 1 and a locking force required for the resin lining portion 3.

According to the construction of the first embodiment constructed as described above, in case that the lining resin is pressure formed, the first gap Rtg in the pipe radial direction is set to the plate thickness t of the divided belt-like ring plates 2b between the inner face of the measuring pipe 1 and the outer circumference face of the cylindrical plate with openings 2a, and in addition, the second gap Rdg in the pipe axis perpendicular direction is set by a division interval of the divided belt-like ring plates 2b.

The first gap Rtg and the second gap Rdg can be set to optimum values arbitrarily by the kind and the melting point of the lining resin, the pressure of the molding equipment, and the locking force and mechanical strength for the negative pressure required for the resin lining portion 3.

According to the electromagnetic flow meter of the first embodiment constructed as described above, in case that the resin lining portion 3 is formed by lining in the measuring pipe 1, the resin to be lined by the pressure molding can be pressurized from any direction of the pipe axis direction and the direction perpendicular to the pipe axis, via the gaps formed by the first gap and the second gaps set by the divided belt-like ring plates 2b, so that the resin can be easily injected with a small pressure loss.

That is, without requiring a high level pressure molding equipment such as transfer molding in case that the resin is injected from a lot of openings of the cylindrical plate with openings 2a as in the conventional, the resin can be filled easily in the gap between the measuring pipe 1 and the lining locking frame 2 without generating air bubbles and generating stress strain only by pressurizing the melted lining resin in the molding die, so that the electromagnetic flow meter provided with the resin lining portion 3 which is uniform and high in quality can be provided.

Figure 2A:
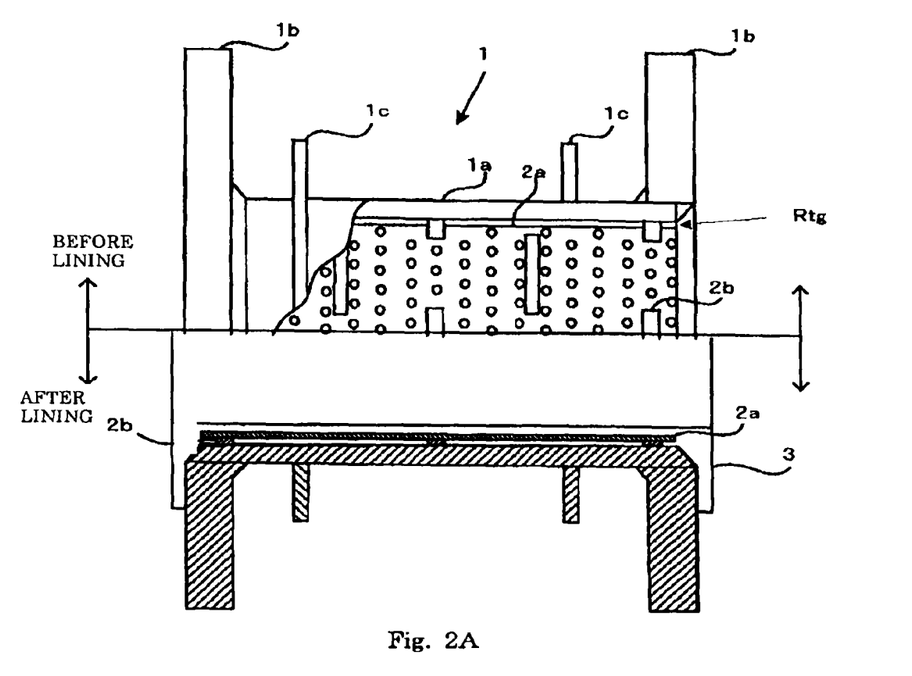
FIGS. 2A, 2B are diagrams, each explaining detailed setting example of the divided belt-like ring plates of the lining locking frame using the cylindrical plate with openings according to the first embodiment of the present invention.
Figure 2B:
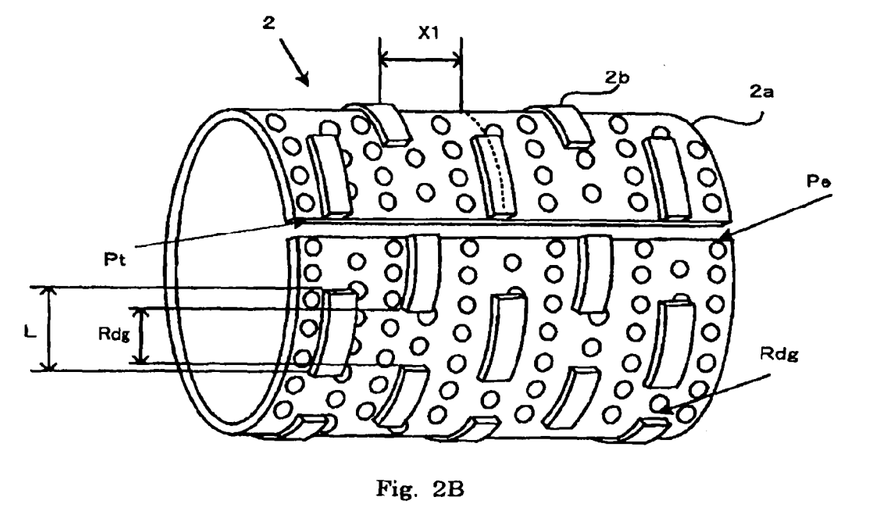

In addition, it is preferable that the second gap Rdg between the adjacent divided belt-like ring plates 2b do not overlap seen from the direction of the outer circumference pipe axis of the measuring pipe 1 as shown in FIG. 2, and the second gap Rdg and the divided length L of the belt-like plates are set to satisfy the relation that $0.5 \cdot L \leq Rdg \leq 1.5 \cdot L$.

Second Embodiment

Figure 3A:
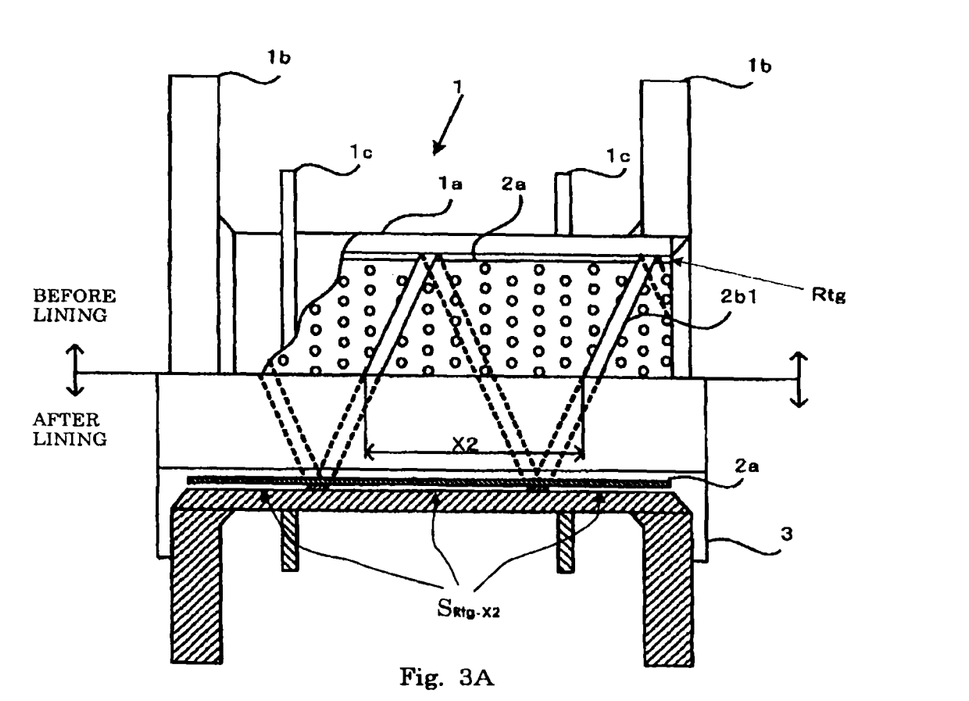
FIGS. 3A, 3B are diagrams, each showing a construction of an electromagnetic flow meter according to a second embodiment of the present invention which is provided with a lining locking frame composed of a cylindrical plate with openings and a spiral plate.
Figure 3B:
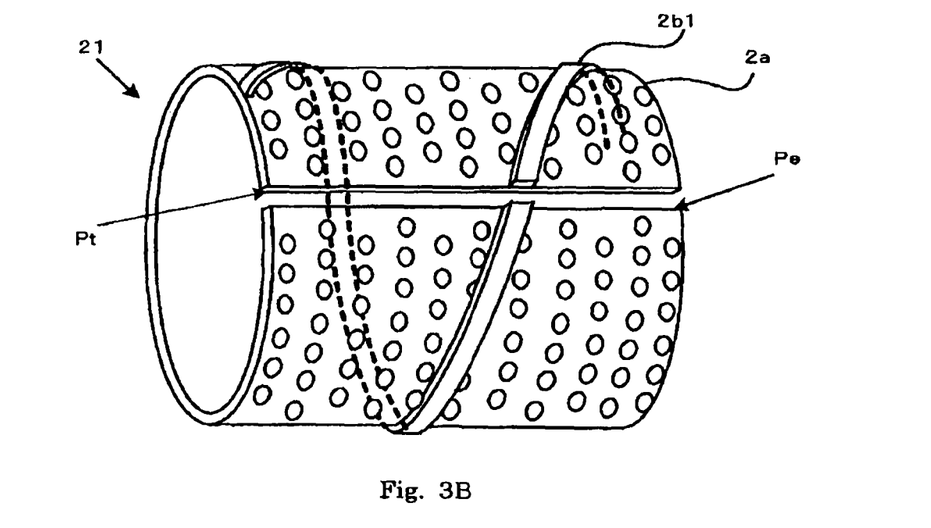

A second embodiment of the present invention will be described with reference to FIGS. 3A, 3B. FIGS. 3A, 3B are diagrams to explain a construction of an electromagnetic flow meter of a second embodiment of the present invention which is provided with a lining locking frame 21 composed of the cylindrical plate with openings 2a and a belt-like spiral plate 2b1.

Regarding the each portion of the second embodiment, the same portion of the each portion as in the electromagnetic flow meter shown in the first embodiment of FIGS. 1A, 1B is shown by the same reference numeral, and the detailed description thereof is omitted. The point in the second embodiment different from the first embodiment is that the lining locking frame 21 is composed using the belt-like spiral plate 2b1, in place of the divided belt-like ring plates 2b of the lining locking frame 2.

A construction of the lining locking frame 21 is composed of the cylindrical plate with openings 2a formed by facing both end faces Pt, Pe of a belt-like plate with openings with a prescribed length in the circumference direction of the measuring pipe 1 so that the belt-like plate with openings becomes a cylindrical shape concentric with the measuring pipe 1 in the measuring pipe 1, and a belt-like spiral plate 2b1 composed of a belt-like plate pasted spirally around the outer circumference of the cylindrical plate with openings 2a. Here, a thickness of the belt-like plate is set to a prescribed thickness, and the first gap Rtg is set between the inner face of the measuring pipe 1 and the outer circumference face of the cylindrical plate with openings 2a. The belt-like plate is wound around the cylindrical plate with openings 2a in the pipe axis direction of the measuring pipe 1 with a prescribed spiral pitch (an interval X2) so as to provide a third gap $S_{Rtg-X2}$.

The spiral pitch X2 can be set arbitrarily to an optimum value based on a pipe diameter of the measuring pipe 1 to be resin lined and a plate width of the belt-like plate, by considering the easiness to fit the lining locking frame 21 to the inside of the measuring pipe 1 and a locking force and the mechanical strength required for the resin lining portion 3.

According to the electromagnetic flow meter of the second embodiment constructed as described above, in case of the resin lining portion 3 is formed by lining in the measuring pipe 1, the resin to be lined by the pressure molding can be pressurized along the belt-like spiral plate 2b1 via the gaps formed by the first gap and the third gap set by the belt-like spiral plate 2b1, so that the resin can be easily injected with a small pressure loss.

Accordingly, without requiring a high level pressure molding equipment such as transfer molding in case that the resin is injected from a lot of openings of the cylindrical plate with openings 2a as in the conventional, the resin can be filled easily in the gap between the measuring pipe 1 and the lining locking frame 21 without generating air bubbles and generating stress strain only by pressurizing the melted lining resin in the molding die, so that the electromagnetic flow meter provided with the lining portion 3 which is uniform and high in quality can be provided.

Third Embodiment

Figure 4A:
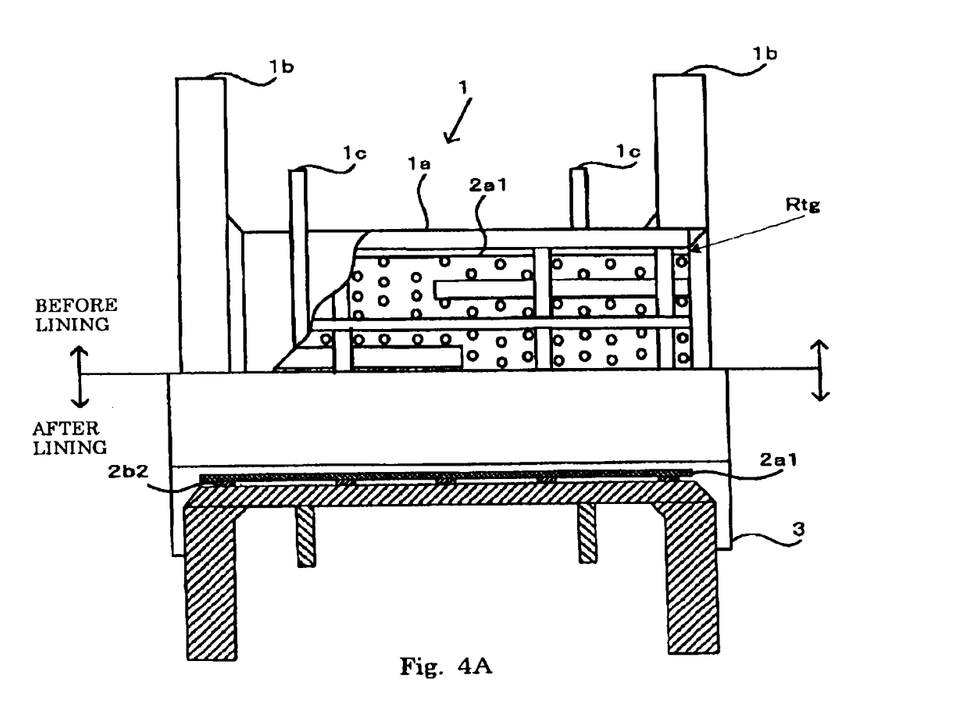
FIGS. 4A, 4B are diagrams, each showing a construction of an electromagnetic flow meter according to a third embodiment of the present invention which is provided with a lining locking frame composed of a cylindrical plate with openings having cutout portions at both end portions.
Figure 4B:
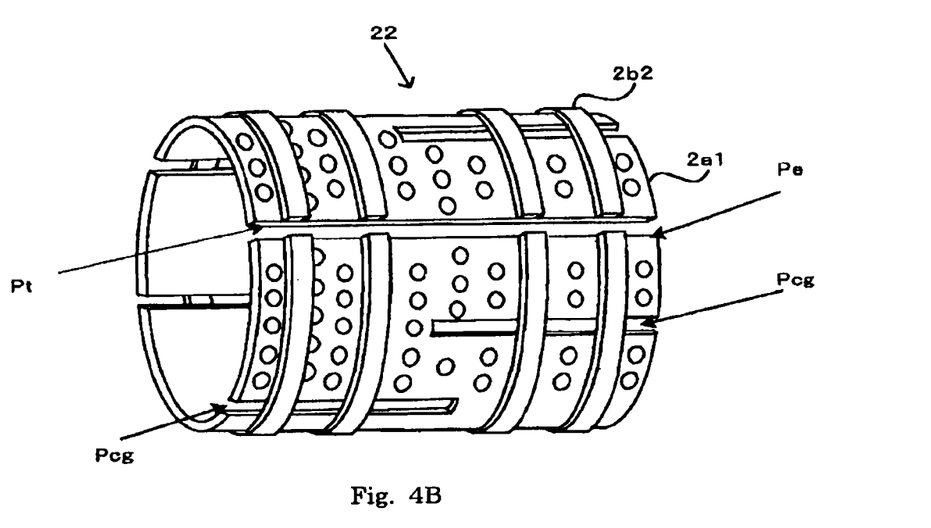

A third embodiment of the present invention will be described with reference to FIGS. 4A, 4B. FIGS. 4A, 4B are diagrams to explain a construction of an electromagnetic flow meter according to a third embodiment of the present invention which is provided with a lining locking frame 22 composed of a cylindrical plate with openings 2a1 and belt-like ring plates 2b2.

Regarding the each portion of the third embodiment, the same portion of the each portion as in the electromagnetic flow meter shown in the first embodiment of FIGS. 1A, 1B is shown by the same reference numeral, and the detailed description thereof is omitted. The point in the third embodiment different from the first embodiment is that the lining locking frame 22 is composed of the cylindrical plate with openings 2a1 formed by providing cutout portions at both end portions of the cylindrical plate with openings 2a and the belt-like ring plates 2b2, in place of the lining locking frame 2 composed of the cylindrical plate with openings 2a and the divided belt-like ring plates 2b.

The lining locking frame 22 is provided with the cylindrical plate with openings 2a1 formed by facing both end faces Pt, Pe of a belt-like plate with openings with a prescribed length in the circumference direction of the measuring pipe 1 so that the belt-like plate with openings becomes a cylindrical shape concentric with the measuring pipe 1, and a plurality of the belt-like ring plates 2b2 composed of belt-like plates pasted around the outer circumference of the cylindrical plate with openings 2a1 in the pipe axis direction of the measuring pipe 1 with a prescribed interval.

And in the cylindrical plate with openings 2a1, not less than two cutout portions Pcg are provided from an end which are provided alternately from the both ends in the pipe axis direction and so as to lap in the pipe axis direction, and in addition, a thickness of the belt-like ring plates 2b2 is set a prescribed thickness and the first gap Rtg is provided between the inner face of the measuring pipe 1 and the outer circumference face of the cylindrical plate with openings 2a1.

According to the electromagnetic flow meter of the third embodiment constructed as described above, in case that the resin lining portion 3 is formed by lining in the measuring pipe 1, the resin to be lined by the pressure molding can be easily injected in the gap between the measuring pipe 1 and the lining locking frame 22, via the gaps formed by the first gap Rtg and the fourth gaps by the cutout portions Pcg.

The first gap Rtg and the fourth gap Pcg can be set to optimum values arbitrarily by the kind and the melting point of the lining resin, the pressure of the molding equipment, the locking force and mechanical strength for the negative pressure required for the resin lining portion 3.

Accordingly, without requiring a high level pressure molding equipment such as transfer molding in case that the resin is injected from a lot of openings of the cylindrical plate with openings as in the conventional, the resin can be filled easily in the gap between the measuring pipe 1 and the lining locking frame 22 without generating air bubbles and generating stress strain only by pressurizing the melted lining resin in the molding die, so that the electromagnetic flow meter provided with the resin lining portion 3 which is uniform and high in quality can be provided.

Fourth Embodiment

Figure 5A:
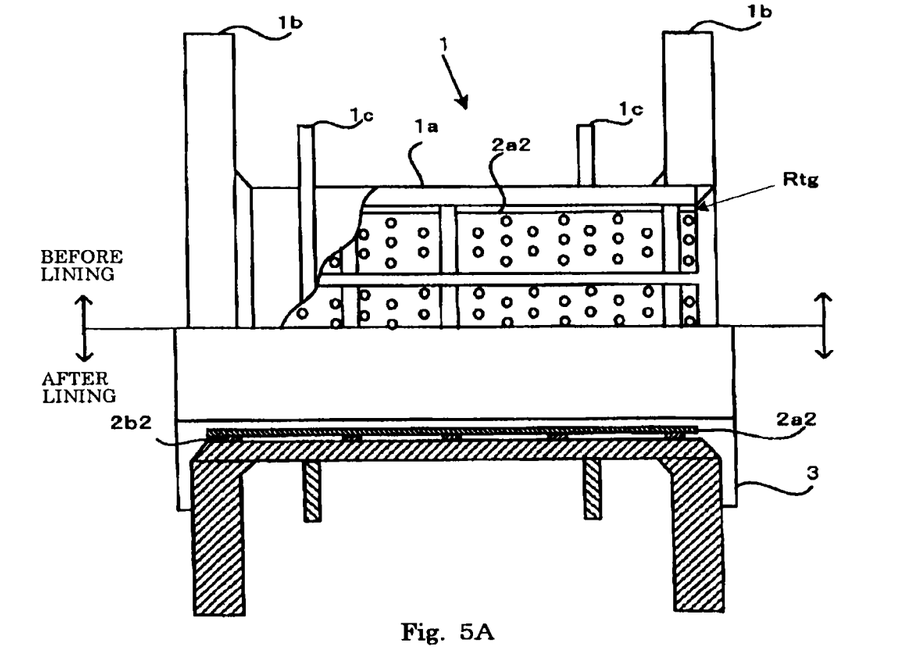
FIGS. 5A, 5B are diagrams, each showing a construction of an electromagnetic flow meter according to a fourth embodiment of the present invention which is provided with a lining locking frame composed of a plurality of divided cylindrical plates with openings and belt-like ring plates.
Figure 5B:
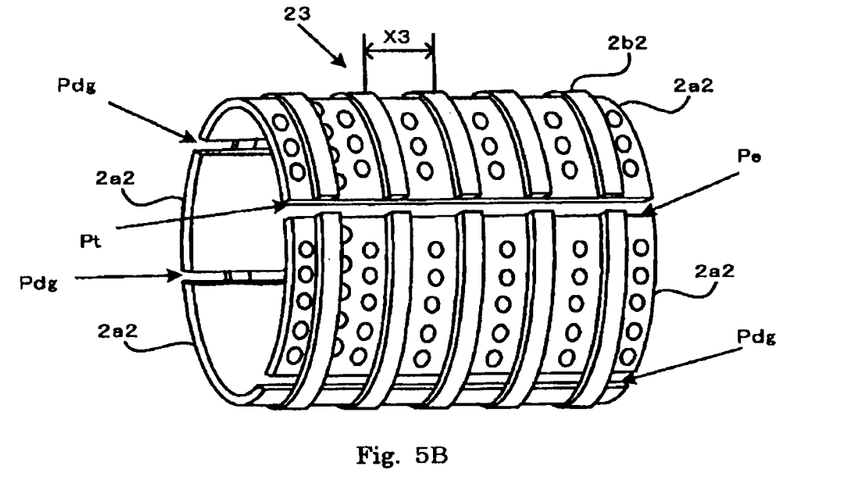

A fourth embodiment of the present invention will be described with reference to FIGS. 5A, 5B. FIGS. 5A, 5B are diagrams to explain a construction of an electromagnetic flow meter according to a fourth embodiment of the present invention which is provided with a lining locking frame 23 composed of a plurality of divided cylindrical plate with openings 2a2 and belt-like ring plates 2b2.

Regarding the each portion of the fourth embodiment, the same portion of the each portion as in the electromagnetic flow meter shown in the first embodiment of FIGS. 1A, 1B is shown by the same reference numeral, and the detailed description thereof is omitted. The point in the fourth embodiment different from the first embodiment is that the lining locking frame 23 is composed of a plurality of the divided cylindrical plates with openings 2a2 and the belt-like ring plates 2b2, in place of the lining locking frame 2 composed of the cylindrical plate with openings 2a and the divided belt-like ring plates 2b.

A construction of the lining locking frame 23 is composed of the divided cylindrical plate with openings 2a2 formed by providing prescribed fifth gaps Pdg between both end faces of not less than belt-like plate with openings with a prescribed length in the circumference direction of the measuring pipe 1 so that the belt-like plates with openings form a cylinder concentric with the measuring pipe 1, and a plurality of the belt-like ring plates 2b2 composed of belt-like plates pasted around the outer circumference of the divided cylindrical plates with openings 2a2 in the pipe axis direction of the measuring pipe 1 in a prescribed interval X3. In addition, a thickness of the belt-like plate is set a prescribed thickness, and the first gap Rtg is provided between the inner face of the measuring pipe 1 and the outer circumference face of the divided cylindrical plates with openings 2a2.

The fitting end faces Pt, Pe of the divided cylindrical plates with openings 2a2 are formed preliminarily so that the divided cylindrical plates with openings 2a2 has a diameter which can be fitted to the inner wall face of the measuring pipe 1 as in the first embodiment, and a few of a plurality the of belt-like ring plates 2b2 are spot welded to the inner circumference face of the measuring pipe 1.

In addition, the first gap Rtg and the fifth gap Pdg can be set to optimum values arbitrarily by the kind and the melting point of the lining resin, the pressure of the molding equipment, the locking force and mechanical strength for the negative pressure required for the resin lining portion 3.

According to the electromagnetic flow meter of the fourth embodiment constructed as described above, in case that the resin lining portion 3 is formed by lining in the measuring pipe 1, the resin to be lined by the pressure molding can be easily injected in the gap between the measuring pipe 1 and the lining locking frame 23, via the gap formed by the first gap Rtg and the fifth gaps Pdg.

Accordingly, without requiring a high level pressure forming equipment such as transfer molding in case that the resin is injected from a lot of openings of the cylindrical plate with openings as in the conventional, the resin can be filled easily in the gap between the measuring pipe 1 and the lining locking frame 23 without generating air bubbles and generating stress strain only by pressurizing the melted lining resin in the molding die, so that the electromagnetic flow meter provided with the resin lining portion 3 which is uniform and high in quality can be provided.

Figure 6A:
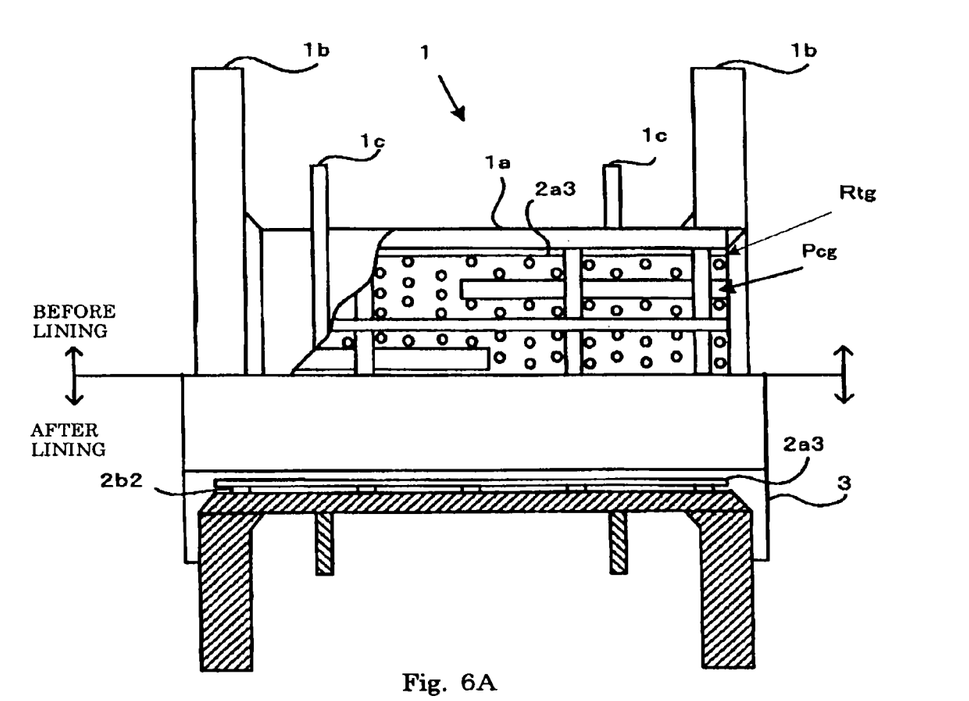
FIGS. 6A, 6B are diagrams, each showing a construction of an electromagnetic flow meter according to another embodiment of the present invention which is provided with a lining locking frame composed of a plurality of divided cylindrical plates with openings having cutout portions at an end portion and belt-like ring plates.
Figure 6B:
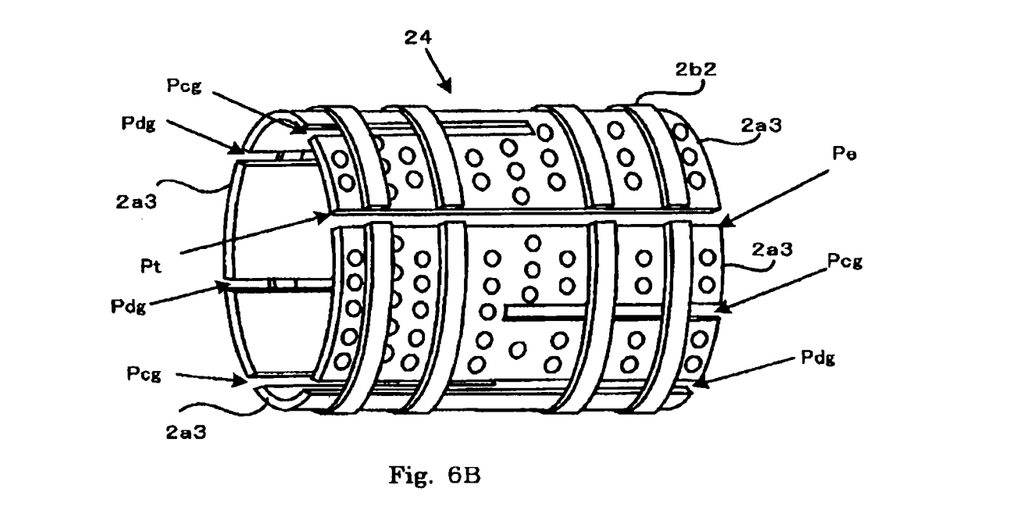

In addition, as shown in FIGS. 6A, 6B, in place of the divided cylindrical plates with openings 2a2 of the lining locking frame 23, a lining locking frame 24 can be constructed as shown in FIGS. 6A, 6B using divided cylindrical plates with openings 2a3, each provided with not less than two cutout portions with a length to lap in the pipe axis direction alternately from the both ends of the pipe axis direction.

Figure 7A:
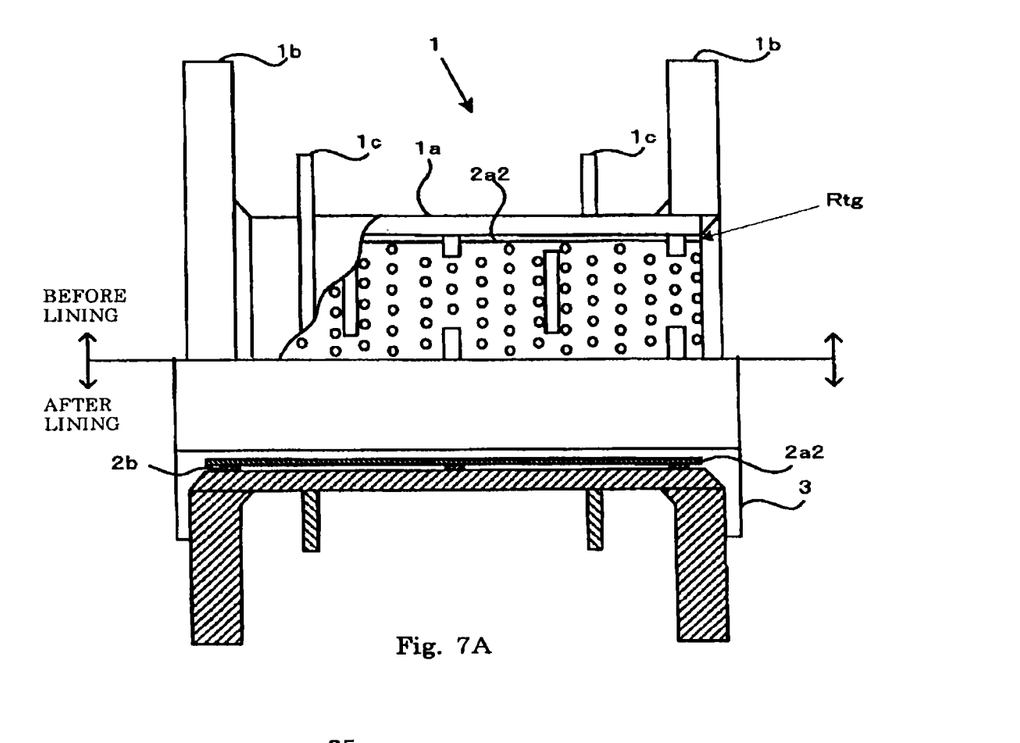
FIGS. 7A, 7B are diagrams, each showing a construction of an electromagnetic flow meter according to another embodiment of the present invention which is provided with a lining locking frame composed of a plurality of divided cylindrical plates with openings and divided belt-like ring plates.
Figure 7B:
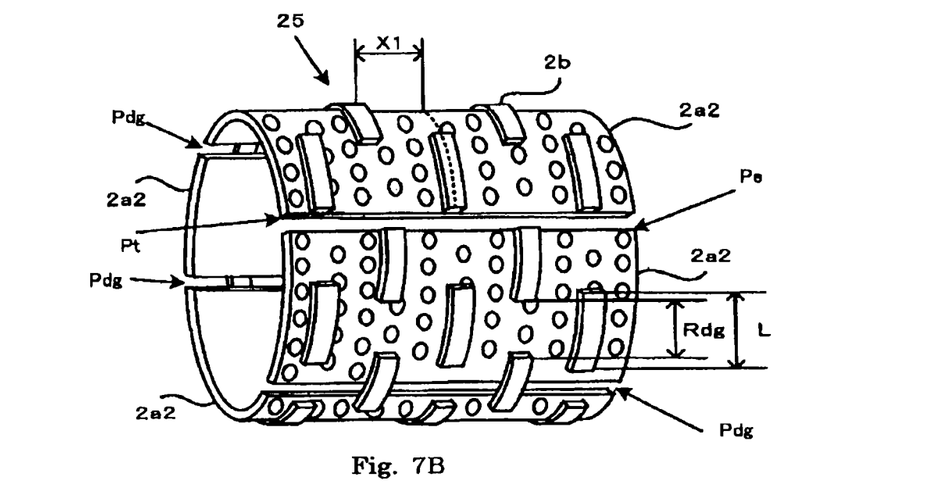

In addition, as shown in FIGS. 7A, 7B, in place of the belt-like ring plates 2b2 of the lining locking frame 23, a lining locking frame 25 can be constructed using divided belt-like plates 2b with the second gaps Rdg which are formed by dividing in the outer circumference direction of the measuring pipe 1 by a prescribed length and a prescribed interval. Here, the second gap Rdg between the adjacent divided belt-like ring plates 2b do not overlap in the direction of the outer circumference pipe axis of the measuring pipe 1, and the second gap Rdg and the divided length L of the divided belt-like ring plates 2b satisfy the relation that $0.5 \cdot L \leq Rdg \leq 1.5 \cdot L$.

The present invention is not limited to the above-described embodiments at all. The lining locking frame may be used in which the gap in which the lining resin to be pressure molded can be pressurized with a low pressure loss is set by the cylindrical plate with openings and the plate thicknesses of the belt-like plates provided around the outer circumference of the cylindrical plate with openings, and which is provided with the locking force and mechanical strength to withstand the negative pressure provision required for the measuring pipe 1. And the present invention can be practiced in various modifications within the scope without departing the gist of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. An electromagnetic flow meter provided with a resin lining portion in which resin is lined in a measuring pipe by pressure molding, comprising:

the measuring pipe to flow liquid to be measured;

a lining locking frame provided in the measuring pipe and composed of a cylindrical plate with openings and a plurality of belt shaped ring plates; and the resin lining portion formed by embedding the lining locking frame;

wherein the cylindrical plate with openings is formed by facing both end faces of a belt shaped plate with openings with a prescribed length in a circumference direction of the measuring pipe so that the belt shaped plate with openings becomes a cylindrical shape concentric with the measuring pipe;

wherein a plurality of the belt shaped ring plates are pasted with a prescribed interval around the outer circumference of the cylindrical plate with openings in the pipe axis direction of the measuring pipe;

wherein the cylindrical plate with openings is provided with not less than two cutout portions from an end which are provided alternately from the both ends in the pipe axis direction and so as to overlap one another in the pipe axis direction;

wherein in addition, a thickness of each of the plurality of belt shaped ring plates is a prescribed thickness, and a first gap is provided between the inner face of the measuring pipe and the outer circumference face of the cylindrical plate with openings; and wherein the resin to be lined can be filled in gaps between the measuring pipe and the lining locking frame during pressure molding of the resin lining portion via gaps formed by the cutout portions.

2. An electromagnetic flow meter provided with a resin lining portion in which resin is lined in a measuring pipe by pressure molding, comprising:

the measuring pipe to flow liquid to be measured;

a lining locking frame provided in the measuring pipe composed of divided cylindrical plates with openings and a plurality of belt shaped ring plates; and the resin lining portion formed by embedding the lining locking frame;

wherein the divided cylindrical plates with openings are composed of not less than two belt shaped plates with openings with a prescribed length which are provided to face both end faces of the belt shaped plates with openings of the measuring pipe so as to form a cylindrical shape concentric with the measuring pipe with prescribed gaps in a circumference direction of belt shaped plates with openings;

wherein a plurality of the belt shaped ring plates are pasted with a prescribed interval around the outer circumference of the divided cylindrical plates with openings in the pipe axis direction of the measuring pipe, and a thickness of each of the plurality of belt shaped ring plates is a prescribed thickness and a another gap is provided between the inner face of the measuring pipe and the outer circumference face of the divided cylindrical plates with openings; and wherein the resin to be lined can be filled between the measuring pipe and the lining locking frame during pressure molding of the resin lining portion via the prescribed gaps and the another gap, wherein each of the belt shaped ring plates is composed of divided belt shaped ring plates with a prescribed length and with a further gap by dividing with a prescribed interval in the outer circumference direction of the measuring pipe; and a plurality of the divided belt shaped ring plates are provided so that the further gaps of the adjacent divided belt shaped ring plates do not overlap in the direction of the outer circumference pipe axis of the measuring pipe, and the further gap and the divided length of the belt shaped plate satisfy the relation that $0.5 \cdot L \leq Rdg \leq 1.5 \cdot L$, here, the second gap is Rdg and the divided length of the belt shaped plate is L.

* * * * *